3,519,462
METHOD OF IMPREGNATING POLYMETHYL METHACRYLATE
Alexander Christian Bristol, Stamford, and Allan Ellis Sherr, Norwalk, Conn., assignors to American Cyanamid Company, Stamford, Conn., a corporation of Maine
No Drawing. Filed Mar. 21, 1966, Ser. No. 535,704
Int. Cl. B44d 5/06; C09d 5/18, 5/22
U.S. Cl. 117—33.3     3 Claims

ABSTRACT OF THE DISCLOSURE

A method of impregnating a plastic material without introducing distortions to its surface which comprises immersing the plastic in a heated bath comprising propylene glycol and a plastic additive such as a U.V. absorber or an I.R. absorber; removing the plastic from the bath; and evaporating off the glycol thereby leaving the impregnated plastic material with an undistorted surface.

---

This invention relates to a method of introducing agents to the surface and subsurface of plastics whereby the agent penetrates the surface of the plastic with little or no adverse effect upon the optical quality of the surface. It relates further to coating compositions of a diol or a triol admixed with the plastic additive, which mixtures are useful for surface and subsurface introduction of an improving agent without substantial harm to the surface of the plastic which is being treated.

Prior to the present invention, when it was desired to improve a plastic with an additive, it was the practice to introduce the material by blending it with the plastic and milling or molding the resulting blend into the final article. The improving material thus was dispersed throughout the plastic and was present during the milling or molding operation. Dyes were similarly applied by blending them into the plastic formulation rather than by coating the finished product because the coatings were subject to loss by surface wear and rubbing off. While introducing dyes and additives to plastics by blending them into the plastic formulation rather than by coating means does provide permanency of addition, an effective means for permanently applying such materials to a finished plastic article could be advantageous in many respects. Thus the plastic would not have to be milled with a foreign substance, thereby avoiding possible degradation of the added material and the plastic itself by coaction with the foreign material. Also, less additive or dye is required if these materials are to be concentrated near the surface of the article rather than homogeneously throughout the article.

In view of the lack of a method for introducing compounds to plastic end products, it is an object of the present invention to provide a means whereby dyes and plastic additives and the like can be applied to the surface and near subsurface of plastic materials with little or no adverse effect upon the optical quality of the surface. It is a further object of the present invention to provide compositions which are capable of coating plastic surfaces and subsurfaces without impairing the optical quality of the surface, while at the same time providing a coating which is relatively permanently held to the plastic substrate.

These and other objects are accomplished in accordance with the present invention in a relatively simple and surprisingly effective manner. The present invention is based upon the discovery that certain diol and triol liquid media of 3–8 carbon atoms, in conjunction with heat, have the ability to expand the surface of a plastic which is immersed therein without actually dissolving the plastic. Thus, when the plastic is removed, its surface assumes nearly the condition that it had prior to contacting the diol or triol media.

The liquid media which are useful in the practice of the present invention are glycols or glycerols of 3–8 carbon atoms. Among the useful liquid media, there may be named propylene glycol, 1.3-butylene glycol, 2,3-butylene glycol, triethylene glycol, diethylene glycol, dipropylene glycol, 1,4-cyclohexylene dimethanol, 2,3-hexanediol, 2-ethyl-1,3-hexanediol, neopentyl glycol, glycerol, monomethyl ether of glycerol, mono-ethyl ether of glycerol, and the like. Glycols of 3–4 carbons are especially preferred with propylene glycol being the most preferred liquid media. It is surprising that the present invention is as effective as it is since common liquid media such as ethylene glycol and acetone are ineffective in that they either do not provide a permanent introduction or they destroy the surface of the plastic.

To practice the present invention, the plastic which is to be treated is either dipped into or sprayed with a glycol or glycerol solution or mixture, depending upon whether the coating material is soluble or not, and the plastic is then heated to a temperature in the range of about 35° C. to about 200° C. After the glycol or glycerol is removed from the plastic, the plastic is found to be permanently impregnated by the material which was admixed with the glycol or glycerol. The introduced material cannot be removed by simply rubbing its surface since the coating material is deposited below the surface of the plastic as well as on its surface. While it is not intended to limit the present invention to theoretical considerations, it is believed that immersing the plastic in the glycol or glycerol and heating results in expansion at the surface and just below the surface of the plastic. In this condition, the plastic is receptive to penetration by the coating material. After the glycol or glycerol material is removed, the surface assumes its original condition, entrapping the particles of the coating material so that these particles are permanently attached to the plastic substrate.

It is necessary for the successful practice of the present invention that the plastic be heated while in contact with the glycol or glycerol material. A minimum temperature of about 35° C. is required to make the surface of the plastic receptive to the coating material. It should be noted, however, that the exact temperature to which the plastic must be heated depends upon the desired effect, the length of the period of immersion of the plastic in the glycol or glycerol media and the concentration of the coating material in the liquid media. If a given plastic is to be impregnated and it is desired to control the degree of impregnation, this can be accomplished in several ways. The concentration of the coating material in the glycol or glycerol bath can be raised, the temperature of the bath can be raised, or the immersion time can be increased. By adjusting one or more of these variables, the degree of coating or impregnation can be controlled to within close tolerance.

The temperature of the coating bath should be between 35° C. and 200° C. The choice of the optimum temperature within this broad range will depend upon the nature of the plastic which is being coated. It has been found that thermoplastic materials or thermosetting materials with only moderate cross-linking can generally be successfully coated at temperatures in the lower part of the foregoing range, i.e., at a temperature in the range of about 80° C. to about 115° C. Thermosetting materials which have a high degree of cross-linking generally require higher temperatures for effective penetration, i.e., temperatures in the range of 145° C. to 185° C.

The concentration of the coating bath or spraying mixture can be varied with a concomitant effect on the amount of coating which the plastic will have. If it is desired to achieve heavy impregnation into the plastic material and the concentration of the material in the dipping bath is low, then it will be required to immerse the plastic in the bath for a relatively long period. For practical purposes, it is desirable that the glycol or glycerol media contact the plastic for as short a time as possible to give the desired coating with as little adverse effect on the surface of the plastic as can be obtained. Immersion times can range up to about eight hours. If it is possible, it is preferred that the concentration of the material to be introduced in the bath be high enough so that such long immersion periods are not required. Generally, it is desirable to adjust the concentration in the impregnating bath so that the desired effect can be obtained within an immersion time of about five seconds to one hour. For optimum results, conditions should be adjusted so that the plastic need be immersed for as short a time as possible in as concentrated a dipping bath as possible.

It is an advantage of the present invention that the impregnating material will be introduced into a plastic even though the material is not soluble in the glycol or glycerol medium. This feature allows the present invention to be applied to a very broad range of treating materials. It is possible to penetrate the surface of plastics with ultraviolet light stabilizers, infrared absorbers, dyestuffs, photochromic materials, colloidal metallic particles, flame retardants, anti-static agents, friction reducing agents, electrical conductors, and phosphorescent materials. Other applications of the present invention will be obvious to those skilled in the art.

Among the U.V. absorbers which can be applied to plastics by the method of the present invention are the benzophenones such as 2 - hydroxy-4-octyloxybenzophenone, 2,2'-dihydroxy-4-methoxybenzophenone and 2-hydroxy - 4-methoxybenzophenone; p-methoxybenzylidene malonic acid dimethyl ester; and 2-(2-hydroxyphenyl) benzotriazoles such as 2 - (2-hydroxy-4-methoxyphenyl) benzotriazole. A plastic material which is treated with a U.V. absorber by the method of this invention will be stabilized against degradation upon exposure to light. The advantage of using the present invention to introduce the the ultraviolet absorber to the subsurface rather than by homogeneously dispersing it throughout the plastic formulation is that the U.V. absorber is near the surface of the plastic where it exerts its greatest activity without detracting from the properties of the plastic itself. Also, less U.V. absorber is needed since it is concentrated near the surface.

Plastics can be coated with infrared absorbing materials to thereby render the plastic infrared opaque or substantially opaque. Plastics coated with infrared absorbers are useful in the manufacture of welders' goggles, lenses for sunglasses and in other applications where transparency to visible but not infrared light is desirable.

Similarly, plastics can be treated with conventional or photochromic dyestuffs. Decorative metallic coatings can be introduced to the plastics by forming a suspension of colloidal metallic particles in the glycol or glycerol media and dipping the plastic in the mixture. Advantageously, the plastic assumes an even metallic coating which resists loss by wearing or rubbing off because of subsurface deposition. The plastic can be made phosphorescent by forming a dipping bath of the glycol or glycerol and a phosphorescent material and dipping the plastic.

Antistatic properties can be conferred on the plastic objects by dipping them in a bath of the glycol or glycerol containing an antistatic agent. Similarly, plastic objects can be made to be electrically conductive by forming a dipping bath of the glycol or glycerol with a finely divided electrically conductive material dispersed therethrough. Another application of the present invention is to reduce the coefficient of friction of a particular plastic by dipping it in a bath containing the glycol or glycerol media and a finely divided polyfluorohydrocarbon. Fluorohydrocarbon forms a surface and subsurface coating on the plastic and imparts to the plastic the low coefficient of friction possessed by the introduced material. Plastic materials can be made flame-retardant by forming a mixture of the glycol or glycerol and dispersing therein a flame-retarding agent such as phosphonium halides, phosphine oxides or antimony trioxide and halogenated hydrocarbons. Immersion of a plastic in the bath imparts flame-retardant properties to the plastic.

It is the advantage of the present invention that it is suitable for coating all kinds of plastics including thermoplastic and thermosetting types. Among the plastics which have been successfully coated, there can be named polyesters such as the polycarbonates, the acrylates, the methacrylates and the poly(alkyleneadipates) and the like; cellulosics such as cellulose acetate, cellulose triacetate and cellulose acetate-butyrate; halogen-containing polymers such as polyvinylchloride, polyvinylidene chloride, copolymers of vinyl chloride and vinylidene chloride, polyvinylfluorides, polyvinylidene fluorides, and the like; polyolefins such as polyethylene and polypropylene; polysulfones; polystyrenes; polyamides; and the like. From the diverse variety of materials named above, it can be seen that the exact chemical nature of the plastic material is not critical to the practice of the present invention, which appears to be applicable to any plastic material regardless of its chemical nature.

The following examples are presented to further illustrate the present invention.

EXAMPLE 1

This example shows the application of infrared absorbers to plastics of diverse structure.

Samples of polymers were immersed in a glycol bath at 85–90° C. containing 3% of the infrared absorber which is the product of one electron oxidation of N,N,N',N'-tetrakis(p-diethylaminophenyl)-p-phenylene diamine with silver hexafluoroantimonate. The average immersion time was one minute. The polymers treated in this example have little innate near-infrared absorption (up to 10% absorption), the near-infrared being defined as 800–1100 m$\mu$. The amount of coating absorbed into the plastic is measured by the percent transmittance of the treated plastic at 980 m$\mu$.

The following table summarizes these experiments. The table presents the name of the polymer and the size of each sample, as well as the solvent used to form the treating bath. The time of immersion is also given and the amount of infrared absorber which has been taken up by the plastic sample is indicated by the percent transmittance of radiation having a wavelength of 980 m$\mu$.

TABLE I

| Polymer | Thickness | Solvent | Immersion time | Treated polymer, Percent T at 980 mμ |
|---|---|---|---|---|
| Polycarbonate | 64 mil chip | Propylene glycol | 1 minute | 7 |
| Cellulose acetate butyrate | 29 mil chip | do | do | 1½ |
| Polyvinyl chloride | 8 mil extruded film | do | 1 second | 0 |
| Do | 67 mil chip | do | 1 minute | 27 |
| Polypropylene | 4 mil film | do | do | 78 |
| Polyphenylene oxide | 5 mil film | do | do | 13 |
| Poly(methyl methacrylate) (molded) | Chip | do | do | 1 |
| Poly(methyl methacrylate) (monomer cast) | ⅛" chip | do | do | 31 |
| Polysulfone | 20 mil chip | do | do | 24 |
| Polystyrene | do | do | do | 0 |
| Polyvinyl chloride | 8 mil extruded film | 1,3-butylene glycol | do | 0 |
| Polystyrene | 20 mil chip | do | do | 0.5 |
| Cellulose acetate butyrate | 29 mil chip | do | 1 second | 6 |
| Polyvinyl chloride | 8 mil extruded film | 2,3-butylene glycol | 1 minute | 2 |
| Polystyrene | 20 mil chip | do | do | (¹) |
| Cellulose acetate butyrate | 29 mil chip | do | 1 second | 0 |
| Polyvinyl chloride | 8 mil extruded film | Triethylene glycol | 1 minute | 3 |
| Polystyrene | 20 mil chip | do | do | 37 |
| Cellulose acetate butyrate | 29 mil chip | do | 1 second | 68 |
| Polyvinyl chloride | 8 mil extruded film | Diethylene glycol | 1 minute | 0 |
| Polystyrene | 20 mil chip | do | do | 54 |
| Cellulose acetate butyrate | 29 mil chip | do | 1 second | 72 |
| Polyvinyl chloride | 8 mil extruded film | Dipropylene glycol | 1 minute | 0 |
| Cellulose acetate butyrate | 29 mil chip | do | 1 second | ²4 |

¹ Surface attacked chip was opaque.
² Surface attacked slightly.

EXAMPLE 2

This example shows the use of the present invention in applying ultraviolet absorbers to the surface of plastics.

Polymer samples to be coated were immersed in a propylene glycol bath maintained at 85–89° C. containing one of three U.V. absorbers. U.V. absorbers A and B were present in the bath at a concentration of 3%. U.V. absorber C was in the bath at a concentration of about 1%. The average immersion time for the baths containing U.V. absorbers A and B was approximately 30 seconds. The average immersion time for the bath containing U.V. absorber C was about one minute. The following table shows the concentration of the U.V. absorbers tested in terms of the percent transmission of light in the ultraviolet region, both before and after sample immersion. The U.V. absorbers used in this example are identified as follows:

UV:
    A ____ 2-Hydroxy-4-n-octyloxybenzophenone.
    B ____ Dimethyl p-methoxybenzylidene malonate.
    C ____ 2-(2-Hydroxy-5-methylphenyl)benzotriazole.

Similarly, other solvent materials including glycerol, mono-methyl ether of glycerol, mono-ethyl ether of glycerol, and the like, can be substituted for the glycols used in the foregoing examples.

What is claimed is:

1. A method of impregnating a shaped object of polymethyl methacrylate which comprises immersing the object in a bath consisting essentially of propylene glycol and a plastic additive of ultraviolet light stabilizers, infrared absorbers, dyestuffs, photochromic materials, colloidal metallic particles, flame retardants, antistatic agents, friction reducing agents, electrical conductors, or phosphorescent materials, said bath being maintained at a temperature in the range of 35°–200° C.; removing the object from the bath; and removing the propylene glycol from the object.

2. The method of claim 1 wherein the plastic additive is an ultraviolet absorber.

3. The method of claim 1 wherein the plastic additive is an infrared absorber.

TABLE II

| Polymer | Thickness | UV-A Percent T at 360 mμ | | UV-B Percent T at 350 mμ | | UV-C Percent T at 360 mμ | |
|---|---|---|---|---|---|---|---|
| | | Before | After | Before | After | Before | After |
| Poly(methyl methacrylate) | 50 mil chip | 86.4 | 5.0 | 83.0 | 23.0 | 86.4 | 1.0 |
| Polystyrene | do | 67.5 | 2.6 | 62.8 | 34.2 | 67.5 | 40.0 |
| Polyester | ⅛" chip | 55.4 | 35.0 | 43.0 | 22.0 | 55.4 | 18.5 |
| Polypropylene | 5 mil extruded film | 85.0 | 13.0 | ¹71.8 | 37.8 | 85.0 | 6.2 |
| Polyvinyl chloride | 50 mil chip | 78.0 | 1.9 | 75.2 | 24.0 | 78.0 | 33.5 |
| Polycarbonate | ⅛" chip | 36.7 | 0.2 | 21.2 | 11.0 | 36.7 | 26.9 |

EXAMPLE 3

This example shows the application of the present invention for coating plastics with flame-retardant agents. A bath containing 320 parts of propylene glycol, 80 parts triphenyl phosphine oxide was maintained at 140° C. under agitation. Samples of poly(methyl methacrylate) were immersed and suspended in the solution for about one minute. The dipped samples, after removal of excess propylene glycol, have flame-retardancy.

Following the procedure of the foregoing examples, other materials such as colloidal aluminum, colloidal gold, antistatic agents, particulate polyfluorocarbons, phosphorescent materials, and the like, can be formulated in glycol immersion baths and used to coat the surface of plastic material.

References Cited
UNITED STATES PATENTS

| | | | |
|---|---|---|---|
| 2,938,811 | 5/1960 | Hermes | 8—130.1 |
| 3,307,900 | 3/1967 | Nakanome et al. | 8—4 |
| 1,747,861 | 2/1930 | David | 8—93 |
| 2,059,856 | 11/1936 | Eastman et al. | 117—138.8 |
| 2,086,590 | 7/1937 | Whitehead | 117—139.5 X |
| 2,120,552 | 6/1938 | Ellis et al. | 8—93 X |
| 2,153,358 | 4/1939 | Whitehead | 117—139.5 X |
| 2,364,112 | 12/1944 | Every | 117—33.3 X |
| 3,042,624 | 7/1962 | Coleman et al. | 117—33.5 X |
| 3,297,462 | 1/1967 | Fanning | 117—33.3 |

WILLIAM D. MARTIN, Primary Examiner

U.S. Cl. X.R.

117—33.5, 136, 137, 138, 138.8, 160, 227